(12) United States Patent
Joshi

(10) Patent No.: US 9,714,388 B1
(45) Date of Patent: Jul. 25, 2017

(54) METHOD FOR RECYCLING LIQUID WASTE

(71) Applicant: Rohit D. Joshi, Vienna, VA (US)

(72) Inventor: Rohit D. Joshi, Vienna, VA (US)

( * ) Notice: Subject to any disclaimer, the term of this patent is extended or adjusted under 35 U.S.C. 154(b) by 0 days.

(21) Appl. No.: 15/318,697

(22) PCT Filed: Jun. 19, 2016

(86) PCT No.: PCT/US2016/038267
§ 371 (c)(1),
(2) Date: Dec. 14, 2016

(87) PCT Pub. No.: WO2016/209741
PCT Pub. Date: Dec. 29, 2016

Related U.S. Application Data

(60) Provisional application No. 62/183,238, filed on Jun. 23, 2015.

(51) Int. Cl.
| | | |
|---|---|---|
| *C10M 175/02* | (2006.01) | |
| *C10G 7/06* | (2006.01) | |
| *B01D 3/10* | (2006.01) | |
| *B01D 3/32* | (2006.01) | |
| *B01D 3/00* | (2006.01) | |
| *B01D 1/06* | (2006.01) | |
| *C10G 53/02* | (2006.01) | |

(52) U.S. Cl.
CPC .............. *C10G 7/06* (2013.01); *B01D 1/06* (2013.01); *B01D 3/007* (2013.01); *B01D 3/10* (2013.01); *B01D 3/32* (2013.01); *C10G 53/02* (2013.01); *C10M 175/02* (2013.01); *C10G 2300/1007* (2013.01); *C10G 2300/4006* (2013.01); *C10G 2300/4012* (2013.01); *C10G 2300/4056* (2013.01); *C10G 2400/10* (2013.01)

(58) Field of Classification Search
CPC  C10G 7/003; C10G 7/006; C10G 2300/1003; C10G 2300/1007; C10M 175/02
See application file for complete search history.

(56) References Cited

U.S. PATENT DOCUMENTS

| | | | |
|---|---|---|---|
| 6,312,528 B1 | 11/2001 | Summerfield et al. | |
| 7,226,533 B2 * | 6/2007 | Angulo Aramburu | C10G 53/04 |
| | | | 208/179 |
| 8,382,957 B2 | 2/2013 | Farneman et al. | |
| 8,877,992 B2 | 11/2014 | Appel et al. | |

FOREIGN PATENT DOCUMENTS

CA    WO2014015423 A1    1/2014

OTHER PUBLICATIONS

ISA/US, International Search Report and Written Opinion, PCT/US16/38267, 7 pgs, Sep. 14, 2016, USPTO, Alexandria, VA 22313-1450.

* cited by examiner

*Primary Examiner* — Randy Boyer
(74) *Attorney, Agent, or Firm* — Louis Ventre, Jr.

(57) ABSTRACT

A process includes continuous steps and batch steps for recycling waste oil, fuel or antifreeze. The continuous steps include determining the volume of waste; pumping waste toward a distillation vessel; mixing waste with heated waste, and while flowing the waste into the distillation vessel performing steps of: maintaining a vacuum; heating the waste; returning a first portion of heated waste to the distillation vessel and a second-portion to mix with the waste feed; sending gaseous vapors to a condenser; returning some condensed liquid to the distillation vessel; and delivering condensed liquid as a product. The batch steps include: stopping waste flow into the distillation vessel; reducing pressure; heating the waste; returning the heated waste to the distillation vessel; condensing gaseous vapors; returning some condensed effluent to the distillation vessel; delivering some condensed effluent as a first product; and delivering heated waste as a second product.

1 Claim, 7 Drawing Sheets

METHOD FOR RECYCLING LIQUID WASTE

CROSS-REFERENCE TO RELATED APPLICATION

This application claims the benefit of U.S. Provisional Application No. 62/183,238, filed 23 Jun. 2015, which is hereby incorporated by reference herein.

TECHNICAL FIELD

In the field of mineral oils, including hydrocarbons, a refining process for treating a mineral oil to remove impurities and undesirable non-mineral oil components therefrom to render them suitable for reuse wherein used oil is purified by distillation and mechanical removal of gaseous material by heating and use of reduced pressure.

BACKGROUND ART

The prior art involves either multi-stage continuous processes or batch processes necessitating higher temperatures and lower pressures in successive continuous stages and use of special equipment such as wiped film-evaporators.

SUMMARY OF INVENTION

A process includes continuous steps and batch steps for recycling liquid waste. The liquid waste being at least one of oil, fuel, solvents and antifreeze.

The continuous steps include steps of determining a fixed volume of liquid waste to be recycled; pumping a first flow stream of the fixed volume of liquid waste toward the distillation vessel in a continuous manner; mixing into the first flow stream a second-portion of a heated bottoms stream to form a column feed stream flowing into the distillation vessel; and while flowing the column feed stream into the distillation vessel performing the following steps: maintaining a vacuum pressure in the distillation vessel in a range of 100 to 1000 millimeters of mercury absolute; heating the column feed stream in a reboiler to form the heated bottoms stream; returning a first portion of the heated bottoms stream to the distillation vessel and the second-portion of heated bottoms stream to mix with the first flow stream; sending gaseous vapors formed in the distillation vessel out of the distillation vessel to a heat exchanger to remove heat from gaseous vapors so as to condense them and create a liquid (condensate) effluent and a gaseous effluent (off-gas or vent gas); returning a first volume of the liquid effluent to the distillation vessel; and delivering a second-volume of the liquid effluent as product.

The batch steps include the steps of: stopping the flow of column feed stream into the distillation vessel once the mass of liquid waste to be recycled has flowed into the distillation vessel; and steps performed after stopping the flow of column feed stream into the distillation vessel including: reducing the pressure in the distillation vessel; heating the column feed stream in a reboiler to continue forming the heated bottoms stream; returning the heated bottoms stream to the distillation vessel until the heated bottoms stream within the distillation vessel reaches a target temperature in a range of 120 degrees Centigrade to 310 degrees Centigrade; sending gaseous vapors formed in the distillation vessel out of the distillation vessel to a heat exchanger to remove heat from gaseous vapors and continue to create the liquid effluent and the gaseous effluent; continuing to return the first volume of the liquid effluent to the distillation vessel; delivering a second volume of the liquid effluent as a first product; and delivering the heated bottoms stream as a second product. At the end of the batch steps, the process may be repeated all over again.

Technical Problem

The number of steps in prior art waste processing methods requires a complex arrangement of equipment components and a complicated series of steps for each component. A method is needed that employs a minimum of equipment and is performed with fewer overall steps to product delivery.

Prior art methods involve continuous distillation steps to for recycling large volumes of waste. Batch processing is possible for smaller volumes. Larger annual throughputs using a strictly batch process would require very large volume batches or very many more batches which makes the equipment either expensive or the operations unwieldy. There is no hybrid waste recycling process available for large volumes of liquid waste that can achieve lower cost by running quasi-continuously, requiring fewer processing components and also result in shorter processing times.

Existing continuous spent lubricant refineries fail to recover substantial quantities of lubricating oil base stock after processing waste and currently available re-refineries are unable to recover these because of limitations of their continuous process schemes, such as those with wiped film evaporators. A process is needed that can be tacked on the back end of the refinery process to recover significantly greater proportion of the remaining lubricating oil base stock.

Solution to Problem

The solution is a method that utilizes both continuous steps and batch steps for recycling liquid waste using a single distillation vessel where the liquid waste is an oil, a fuel, a solvent and/or an antifreeze. The process enables recovery of a resource such as lubricating oil base stock from spent additives, water and other contaminants or ethylene glycol from spent antifreeze.

Advantageous Effects of Invention

The process disclosed herein differs from the prior art in that just one set of heater-flash chamber/distillation column-condenser is required in place of the 3-4 steps each with a heater or an evaporator, column and a condenser.

Therefore, the capital investment can be reduced by 60-70%. At the same time, the process is a combination of continuous and batch process steps. During the period of time in which feedstock is pumped in, the process involves continuous steps involving heating and vacuum treating to evaporate the lighter components, typically water and light hydrocarbons. This allows energy-intensive step of water evaporation to be carried out at only the minimum necessary vacuum or without vacuum. The continuous process also reduces the volume of waste so it may be more economical for the batch processing steps. Once a volume of waste is collected in the vessel the batch process steps begin. Batch processing subjects the waste to carefully and gradually higher temperatures and higher vacuum conditions which is highly desirable and, whereupon a recycled product is produced.

Several commercial facilities (also called "re-refinery") processing spent lubricants to recover lubricating oil base stock (LOBS) produce a bottoms (residue) product (RRB) that still contain substantial quantities of heavy fractions of LOBS which the re-refineries are unable to recover because of limitations of their continuous process schemes. The disclosed process may be installed downstream of these commercial re-refineries to extract a further 10-60% LOBS from their RRB streams.

For these commercial facilities, the present process is advantageous because the continuous pump-in stage will preheat the RRB (preferably to 580° F.) and evaporate most of the LOBS fractions present, under vacuum, preferably 3-5 mm Hg (abs). When the preset mass of RRB is metered in, the batch-phase of the distiller begins exerting higher temperatures (up to 345° C. or 650° F.) and vacuum, preferably 0.1-1 mm Hg (abs). In this manner, valuable heavy-fractions of base stock are recovered from RRB. The same principle may be used for concentrating bottoms from other multi-component wastes.

BRIEF DESCRIPTION OF DRAWINGS

The drawings illustrate preferred embodiments of the method for recycling liquid waste according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made without departing from the scope of the present invention.

It will be readily understood that the features of the present invention, as generally described and illustrated in Figures herein, may consist of a variety of different configurations. Thus, the following more detailed description of the embodiments of the system and method of the present invention, as represented in FIGS. 1-6, is not intended to limit the scope of the claimed invention, but it is merely representative of the presently preferred embodiments of the invention.

A process (100) includes continuous steps (105) and batch steps (205) for recycling liquid waste, said liquid waste including at least one of oil, fuel, solvents and antifreeze.

The continuous steps (105) include a volume step (110); a pumping step (115); a mixing step (120); a maintaining step (125): a heating step (130); a first portion step (135); a sending step (140), a first volume step (145), and a first product step (150).

The volume step (110) is determining a fixed volume of liquid waste to be recycled, said determination based on not exceeding the volumetric capacity of a distillation vessel (355) used in the process. A predetermined mass or volume of oil may be added into the distillation vessel (355), which may be referred to as a flash vessel or flash tank. This may be accomplished using a mass or liquid volume flowmeter at a feedstock pump (315). Alternatively, the predetermined volume may be gauged by measuring a drop in the level of liquid waste in a storage tank (305) for the feedstock. Alternatively and preferably, the predetermined volume is determined by measuring the rise in liquid level in the distillation vessel (355) knowing that the liquid level in the distillation vessel (355) will be waste (feedstock) free of water and compounds with boiling points similar to water because those will have evaporated continuously as the feedstock is being pumped in.

Figure 1:
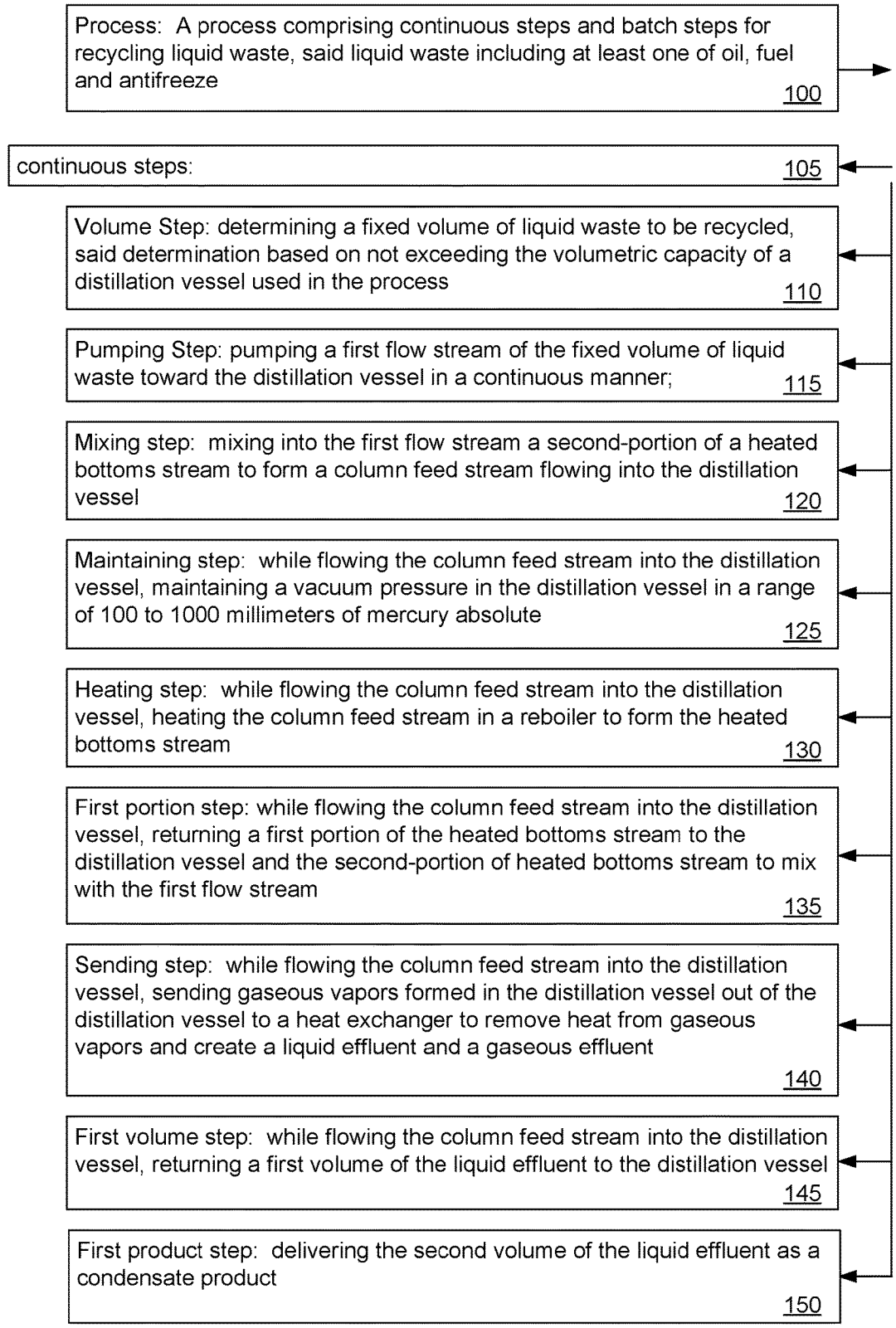
FIG. 1 is a block diagram of the continuous process steps in a preferred method.
Figure 2:
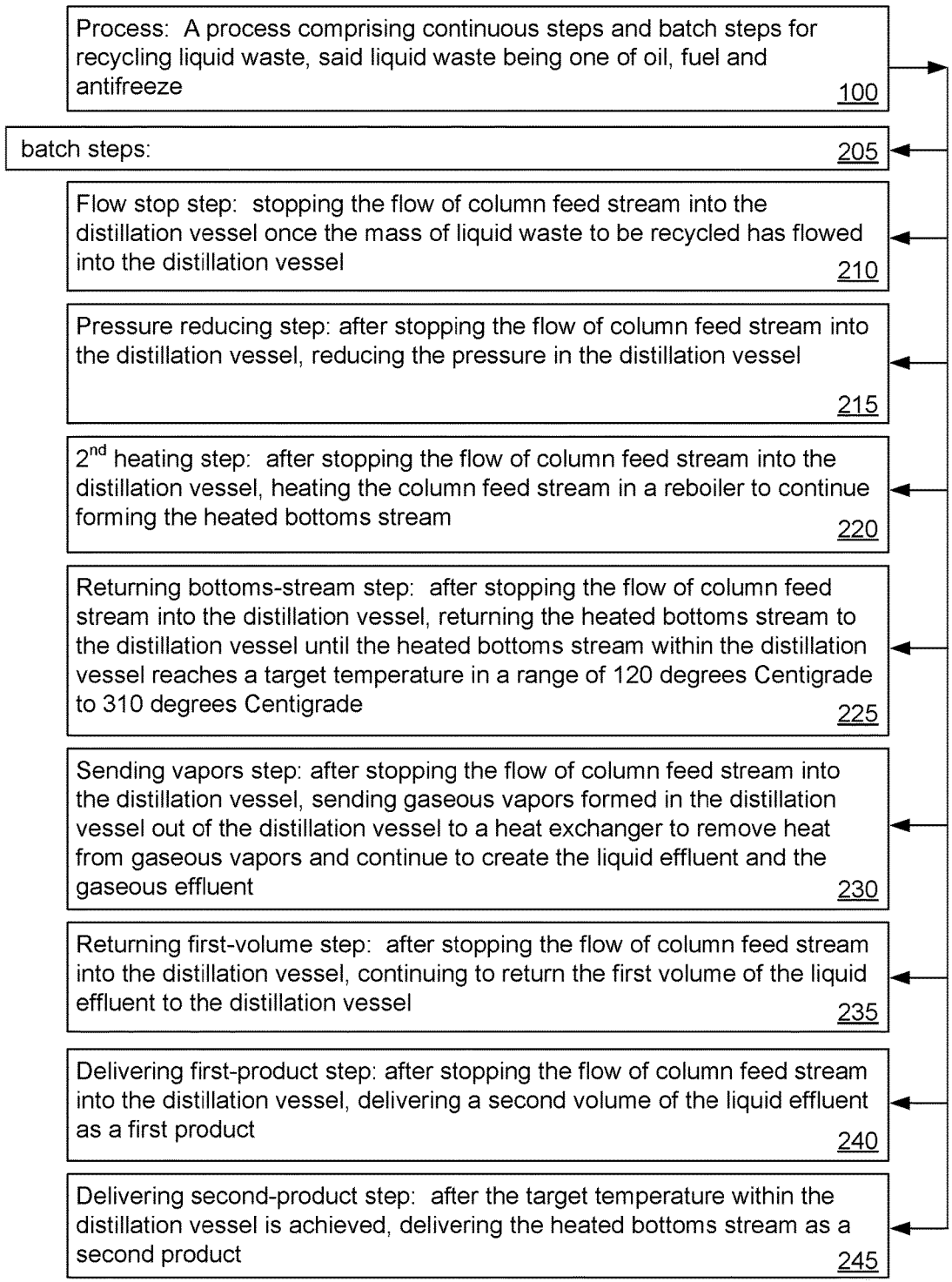
FIG. 2 is a block diagram of the batch steps in this method.
Figure 3A:
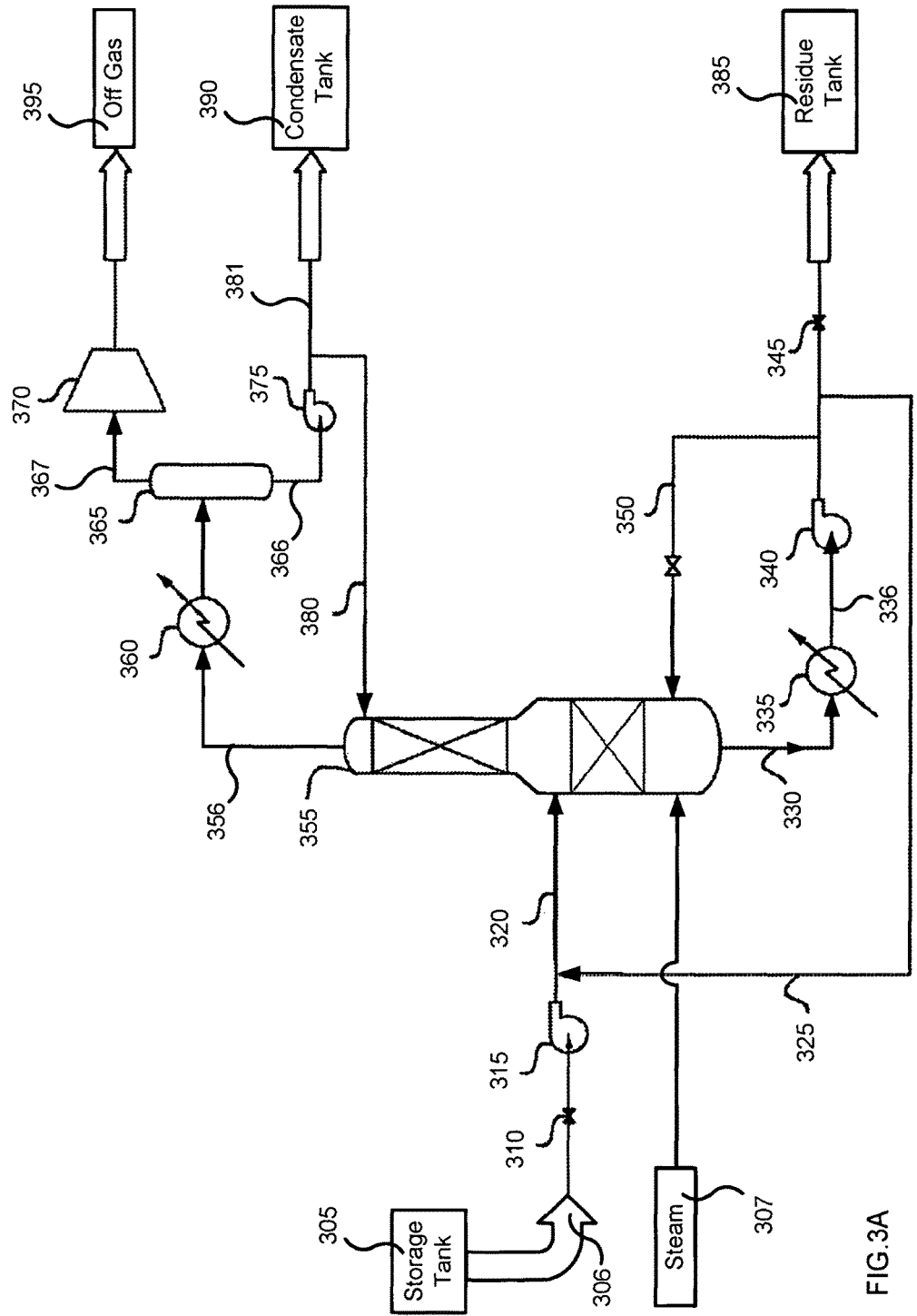
FIG. 3A is a process flow diagram utilizing a single distillation column with a reboiler and overhead condenser.
Figure 3B:
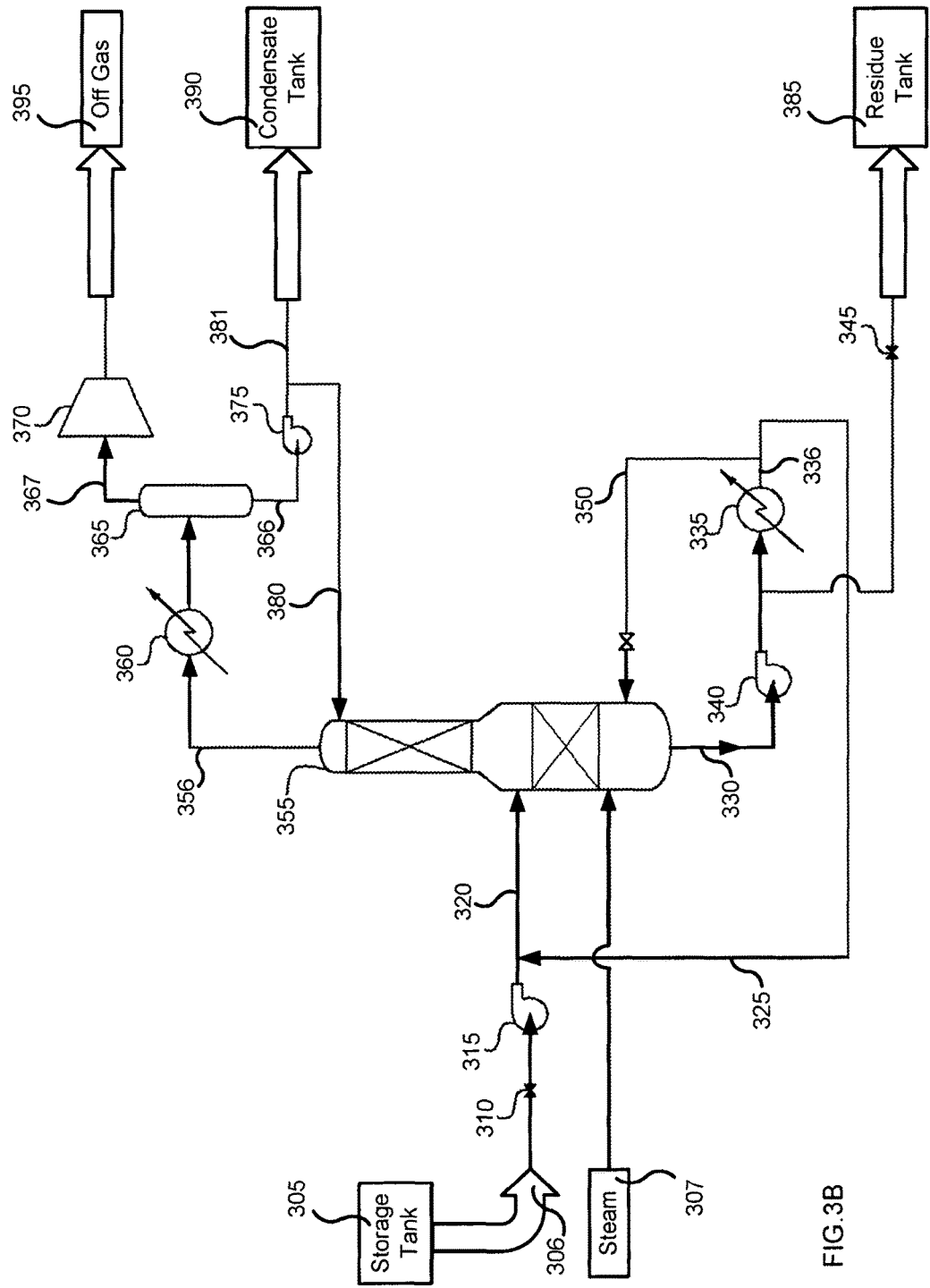
FIG. 3B is an alternate process flow diagram utilizing a single distillation column with a reboiler and overhead condenser where the location of the recirculation pump and the reboiler are changed in relation to one another.

FIG. 3A and FIG. 3B are alternate process flow diagrams utilizing a single distillation column with a reboiler and overhead condenser. The difference lies in the location of the recirculation pump (340) and reboiler (335) in relation to one another. In a thermos-siphon reboiler unit, the reboiler (335) precedes recirculation pump (340). In forced-circulation reboiler/heater, recirculation pump (340) is before the reboiler (335).

The distillation vessel (355) is typically a cylindrical tall shell, i.e., a pressure vessel, with void and an entry nozzle to the distillation vessel (355). The distillation vessel (355) is also referred to as the "column" and "column" is short for "distillation column."

The pumping step (115) is pumping a first flow stream (306) of the fixed volume of liquid waste toward the distillation vessel (355) in a continuous manner. The liquid waste is termed a feedstock and is preferably a used lubricating oil, a fuel such as fuel oil, a mixture of solvents, or a waste antifreeze (coolant). The feedstock is preferably held in a storage tank (305). A feed on/off valve (310) controls its availability to a feedstock pump (315) for pumping toward the distillation vessel (355) at fixed rate. Typically, the feedstock is pumped at a rate of between about 10 liters (2-3 gallons)/hour to about 20,000 liters (5000 gallons)/hour. In one preferred embodiment, the feedstock is pumped at a rate of from about 150 liters (40 gallons)/hour to about 6000 liters (1600 gallons)/hour.

The mixing step (120) is mixing into the first flow stream (306) a second-portion of a heated bottoms stream (325) to form a column feed stream (320) flowing into the distillation vessel (355) under pressure. The second-portion of a heated bottoms stream (325) originates from the bottom of the distillation vessel (355).

Preferably, the mixing step (120) heats the feedstock by mixing the first flow stream (306) with the second-portion of a heated bottoms stream (325), which is above 200° F. Typically, the second-portion of a heated bottoms stream (325) is in the range of 200-650° F. In one preferred embodiment, the second-portion of a heated bottoms stream (325) (also referred to as a recycle bottom stream or just a recycle stream) is in the range of 300-560° F.

The distillation vessel (355) is preferably maintained at a pressure in a range of 100 to 1000 millimeters of mercury absolute. As the column feed stream (320) enters the distillation vessel (355) at a high temperature from the mixing step (120), the water and components with boiling points similar to water that are present in the column feed stream are evaporated during continuous pump-in of the column feed stream. Stated another way, during continuous pump-in of the column feed stream (320), mainly water is evaporated therefrom through the use of heat and vacuum.

The maintaining step (125) is performed while the column feed stream is fed into the distillation vessel and the step requires maintaining a vacuum pressure in the distillation vessel (355) in a range of 100 to 1000 millimeters of mercury absolute.

While processing waste lubricants, higher temperatures and pressures may be selected to also evaporate light hydrocarbons such as fuels, glycols and solvents that may be present along with the water. During the continuous steps, the goal is to evaporate water and collect dried/dehydrated waste in the distillation vessel (355). However, any number of light (compared to those distilled during the batch-stage) components present in the waste can also be evaporated during the pump-in procedure. The lighter components in the column feed stream (320) evaporate and rise through the distillation vessel (355). Preferably, the vapors contact a first volume of liquid effluent (380), also called a reflux stream, over a bed of packings. Depending upon the composition and flow of the reflux stream, part of the vapors from the distillation vessel (355) are condensed and returned to the lower portion of the distillation vessel (355).

In common terms, during this pump-in stage the distillation vessel (355) may be operated either as a forced-circulation flash evaporator or as a distillation column with a condenser at the top and reboiler at the bottom.

The heating step (130) is performed while flowing the column feed stream into the distillation vessel (355) and the step requires heating the column feed stream (320) in a reboiler (335) to form the heated bottoms stream (336), which divides into a first-portion of a heated bottoms stream (350) and the second-portion of a heated bottoms stream (325).

Preferably, the contents of the column in the distillation vessel (355), i.e. the column feed stream (320) in the distillation vessel (355), are drawn into the reboiler (335) from the bottom of the distillation vessel (355) using a recirculation pump (340). After being drawn from the bottom of the distillation vessel (355), the column feed stream (320) is referred to as a "column bottom stream (330)." The recirculation pump (340) removes the column bottom stream (330) from the bottom of the distillation vessel (355) and circulates it through the reboiler (335) and then back to the column in the distillation vessel (355). The preferred flow sheet of FIG. 3A shows the recirculation pump (340) upstream of the reboiler (335). Alternately in the case of a thermos-siphon reboiler, the recirculation pump (340) removes only the liquid portion of heated bottoms stream (336) and sends it back to the distillation vessel (355) and/or as product to storage.

Figure 4:
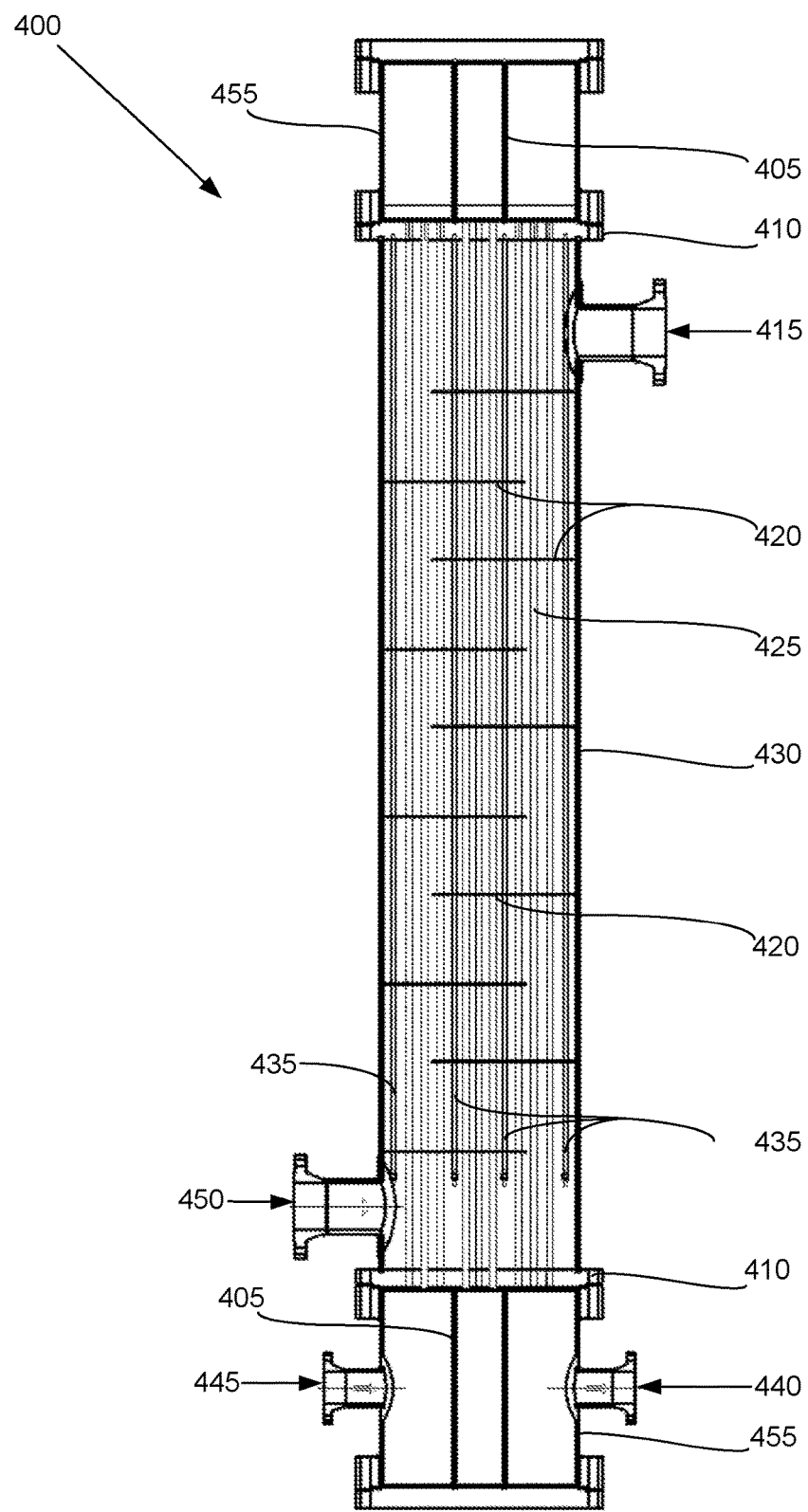
FIG. 4 is the preferred design for the reboiler, a vertical multi-pass shell and tube heat exchanger.
Figure 6:
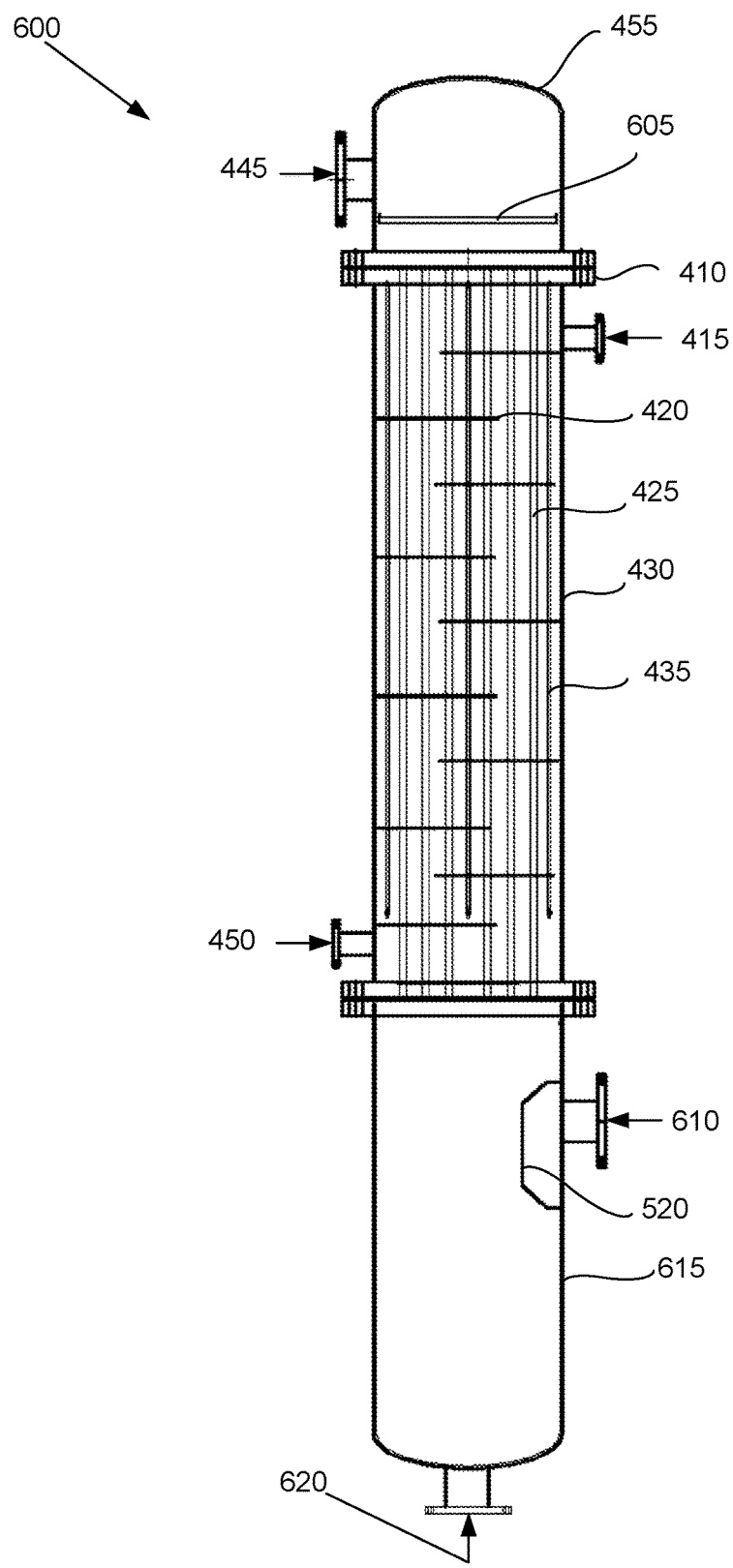
FIG. 6 is an alternate design for the reboiler, a long-tube vertical evaporator.

FIG. 4 and FIG. 6 illustrate alternative variations for the reboiler (335). FIG. 4, for example, shows a multi-pass shell and tube exchanger (400), preferably mounted vertically as displayed in FIG. 4. The multi-pass shell and tube exchanger (400) typically includes a pass partition plate (405) at the top and a tube sheet (410) at the top and bottom, a shell heating medium outlet (415), baffles (420), fixed straight tubes (425), a shell (430), tie rods (435), a tube process-outlet (440), a tube process-inlet (445), a shell heating-medium inlet (450) and a head (455) at the top and bottom.

The fixed straight tubes (425) are preferably cylindrical in cross-section and are fitted into holes in each tube sheet (410), and then sealed. Each head (455) is preferably cylindrical and is attached to each tube sheet (410). This arrangement creates a conventional shell-and-tube assembly with the shell-side for one fluid to transfer heat to another fluid on the tube-side.

The pass partition plates are inserted into the heads to create multiple passes for the tube fluid. Baffles (420) are supported with tie rods (435) and are added to the shell-side so that the shell fluid has a tortuous path therethrough. These modifications increase velocities of tube and shell side fluids which aid in heat transfer.

The inlet and outlet ports, also called nozzles, include the shell heating-medium inlet (450), the shell heating medium outlet (415), the tube process-inlet (445), and the tube process-outlet (440). These nozzles are added to the shell and the heads for entry and exit of the fluids flowing on the shell-side and tube-side, respectively. Preferably, the column bottom stream (330) flows inside the tubes and the heat transfer medium flows on the shell-side.

FIG. 6 shows another variation of reboiler (335). It includes a long-tube vertical evaporator (600) in which the evaporation of components of the waste stream may occur at the heat transfer surface. This reboiler (335) is similar to the one shown in FIG. 4 with respect to its shell, tube sheets, tubes, tie-rods and baffles that create the tube-side and shell-slides for flow of fluids and heat transfer. The long-tube vertical evaporator (600) is different from the multi-pass shell and tube exchanger (400) of FIG. 4 in that the long-tube vertical evaporator (600) has only one tube pass, either upward or downward. It also includes a distribution device (605), tube-side vapor outlet (610), a receiver (615), and a tube-side fluid outlet (620).

Because evaporation is likely to occur inside the tube, one of the heads is converted into the receiver (615), which separates the vapor from the liquid of the tube-side fluid and delivers them separately via the tube-side vapor outlet (610) and the tube-side fluid outlet (620). Also, the distribution device (605) may be used inside the head (455) at the top with the tube process-inlet (445) so as to distribute the entering tube-side liquid evenly to all the vertical tubes.

The column bottom stream (330) is preferably heated in a multi-pass shell and tube exchanger (400), as shown in FIG. 4. Other types of heat exchangers may be used.

The shell heating-medium inlet (450) confines the heating medium to the shell-side and permits exit of the heating medium through the shell heating medium outlet (415). The column bottom stream (330) enters the tube process-inlet (445), is heated inside tubes by the heating medium flowing outside the tubes and exits the tube process-outlet (440). The baffles (420) are used to create turbulence in the flow path of the column bottom stream (330) within the reboiler (335) and enhance heat transfer.

In general, the heater may be any forced circulation type shell-and-tube heat exchanger, such as is conventionally known, or a radiant-type fired heater or a convection-type fired heater. Each of these possible configurations may be referred to as the "heater." The heater may also be referred to as a reboiler (335).

Usually, the column bottom stream (330) is substantially free of low-boiling components, such as water, which are boiled off at the top of the distillation vessel (355). So when the column bottom stream (330) is heated in the reboiler (335), evaporation inside the reboiler (335) (also referred to herein as the forced-circulation heater) is minimized or completely eliminated by keeping the heated bottoms stream (336) pressurized with the use of recirculation pump (340).

Minimizing evaporation inside the reboiler (335) effectively eliminates formation of hot spots of the heat transfer surface. Formation of hot spots on heat transfer surfaces is a primary cause of serious corrosion and fouling (solids deposits) in heat transfer equipment. This feature, common for reboilers, would not have been available for a pure batch process in which the reboiler inlet would have contained all the low-boiling components at the beginning of the batch which would evaporate inside the reboiler (335) causing hot spots on the heat transfer surfaces.

Alternatively, especially if evaporation inside the reboiler (335) cannot be avoided, the reboiler (335) can be a vertical long-tube evaporator (e.g., falling film or rising film) attached to the distillation vessel (355). In this alternative arrangement, however, a condenser (360) (discussed below) is preferably a separate unit connected to the distillation vessel (355).

As a result of the increased temperature and vacuum, a valuable target resource such as lubricating oil base stock (LOBS) evaporates in the distillation vessel (355) from the closed-loop circulating mass of the column feed stream (320). For example, the column feed stream (320) may comprise waste lubricant feedstock or ethylene glycol from waste coolant feedstock or marine diesel and gasoil from waste fuel feedstock.

The light components in vapor-form exit the column in the distillation vessel (355) and are condensed in a condenser (360). The non-condensable gases are sent to an off-gas system for treatment or release to the off-gas discharge (395). The uncondensed vapors in the distillation vessel (355) exit the column and enter the condenser (360) where they are condensed to liquid form. The condensate is received in a condensate receiver (365), which may be the bottom portion of the condenser (360). The condensate is then pumped out by a condensate pump (375).

The condenser (360) is, preferably, a physically separate unit connected to the distillation vessel (355) or it may be mounted on top of the distillation vessel (355). Preferably, the condenser (360) is a U-tube type unit (500), shown in FIG. 5, that is mounted above the column. Alternatively, shell-and-tube or direct contact style unit that are independent of the column may be employed.

Figure 5:
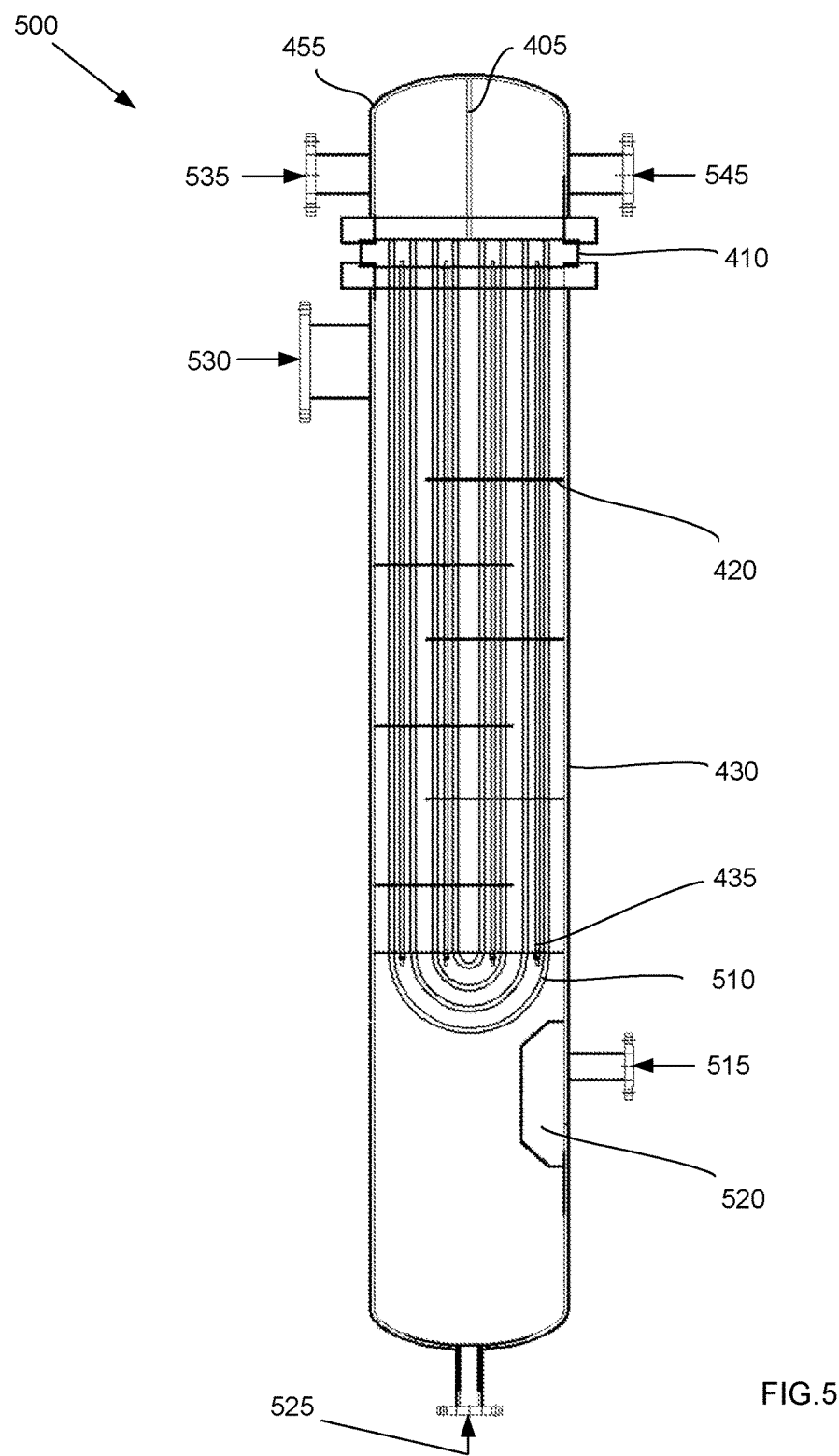
FIG. 5 is the preferred design for the overhead condenser, a U-tube shell and tube heat exchanger.

The heat exchanger of FIG. 5 is similar to the multi-pass shell and tube exchanger (400) of FIG. 4 with respect to its shell, tube sheet, tubes, tie-rods and baffles that create the tube-side and shell-slides for flow of fluids and heat transfer. The U-tube type unit (500) is different from multi-pass shell and tube exchanger (400) in FIG. 4 in that the tubes in the U-tube type unit (500) have a U shape and there is a single tube sheet on which two ends of the U-shape tubes are terminated. Preferably, a cooling medium, such as water, is fed into the tube cooling-media inlet (535) to the U-tubes (510) and vapors emerging from the distillation vessel (355) are routed to the tube cooling-media inlet (535) on the shell side. The cooling medium exits from the cooling-media outlet (545). The gaseous vapors (356) are fed into the shell process-inlet (530) and the condensate flows out the second shell process outlet (525). A mist eliminator (520) is used to eliminate or minimize carryover of the liquid condensate into the gaseous effluent which is the non-condensable vapors.

Because the vapors will be condensed on the outside of the U-tubes (510), the shell (430) is converted into a receiver which also separates the uncondensed vapors from condensate and delivers the vapors to the first shell process outlet (515) and the condensate to the second shell process outlet (525).

The liquid condensate is preferably held in a condensate receiver (365) whereupon it may be split into two streams: a first volume of liquid effluent (380), also called a reflux stream; and a second volume of liquid effluent (381) which is pumped to a condensate tank (390) to exit the process as a first product, which is a condensate product.

The vaporized components from the column feed stream (320) rise from the entry port to make contact with the first volume of liquid effluent (380) (also called the reflux stream). The reflux stream (to wit, the first volume of liquid effluent (380)) is used to rectify the vapors in the distillation vessel (355) and is preferably distributed over structured packings or rings (in general "packings") in the distillation vessel (355) to facilitate good contact between vapors and liquid phases to promote evaporation, i.e., "distillation" and so that a purer (with "narrower" boiling point curve) condensate may be recovered.

The flowrate of reflux stream as a proportion of the second volume of liquid effluent (381) is typically referred to as a calculated fraction or "reflux ratio" in distillation theory. For example, in some embodiments purification of glycols vapors by contact with refluxed glycol-rich liquid enables recovery of glycol with 95% or greater purity.

The unevaporated component of the column feed stream (320) that remains in the distillation vessel (355) is non-volatile liquids present in the column feed stream (320) and are left within the column in the distillation vessel (355) for further processing. This unevaporated component of the column feed stream (320), which remains in liquid form moves downward inside the distillation vessel (355). Optionally, the unevaporated component may be stripped with either steam or vapors formed by recycling a part of the reboiler outlet back into the column. In this case, steam would be introduced by a feed line near the bottom of the distillation vessel (355).

The effect of the steam and/or reboiler vapors serves to evaporate lighter components present in the liquid flowing down the distillation column (1) so as to make the liquid richer in heavier components and devoid of lighter ones.

This continuous processing may take anywhere from 15 minutes to 12 hours depending, for instance, on the heat available and volume of the column feed stream (320) brought into the distillation vessel (355) during the pump-in stage, i.e., the continuous steps (105) of the process.

The gaseous vapors (356) from the column are preferably condensed in the condenser (360). Various fractions of vapors may be separated as they condense over the time during the continuous steps (105) of the process. However, it is noted that lube oil vapors are preferably primarily condensed during the batch steps (205). During the continuous steps (105), for example, lighter fractions evaporate and condense first and the heavier ones at higher temperatures and lower absolute pressure later. In this manner, a variety of different products may be obtained from the condenser (360).

The first portion step (135) is performed while flowing the column feed stream (320) into the distillation vessel (355) and the step requires returning a first portion of the heated bottoms stream (350) to the distillation vessel (355) and the second-portion of heated bottoms stream (325) to mix with the first flow stream (306).

The sending step (140) is performed while flowing the column feed stream (320) into the distillation vessel (355) and the step requires sending gaseous vapors (356) formed in the distillation vessel (355) out of the distillation vessel (355) to a heat exchanger, also called a condenser (360), to remove heat from gaseous vapors and create a liquid effluent (366) and a gaseous effluent (367). A vacuum system (370) preferably includes a system of compressors and steam jets that pull vacuum inside the distillation vessel (355) and the condenser (360).

The first volume step (145) is performed while flowing the column feed stream (320) into the distillation vessel (355) and the step requires returning a first volume of the liquid effluent (380) to the distillation vessel (355).

The first product step (150) includes delivering the second volume of liquid effluent (381) as a condensate product.

For recycling waste lubricants, indeed a separate fractionator is sometimes used to produce base oil fractions of specific viscosities. Such a fractionation tower is unnecessary in the semi-batch scheme described herein. The condensate product or products may be delivered to product tanks as they are condensed.

The continuous steps (105) are completed after the fixed volume of liquid waste to be recycled has entered the distillation vessel (355). The continuous steps (105) require a measured/metered amount of feedstock to be pumped in (typically, 100 liters (25-30 gallon) to 20,000 liters (5000 gallon); preferably 400-10,000 liters/100-2500 gallons). Once that occurs, the feed on/off valve (310) is closed and the feedstock pump (315) is stopped. Depending upon the pump-in flow and available volume in the distillation vessel (355), the pump-in may last anywhere from 5 min to 12 hours. During this stage, the process scheme operates in similar fashion to a typical continuous distillation process with forced circulation reboiler, but with no bottoms produce discharged.

After the continuous steps (105) are completed, the column feed stream (320) in the distillation vessel (355) is then subjected to the batch steps (205) where the column feed stream (320) is circulated through the reboiler (335), except that the process is now in a closed loop. The apparatus operates as a common batch distiller with a bottoms heater, also referred to as the reboiler (335).

The batch steps (205) include a flow stop step (210); a pressure reducing step (215); a $2^{nd}$ heating step (220); a returning bottoms-stream step (225); a sending vapors step (230); a returning first-volume step (235); a delivering first-product step (240); and a delivering second-product step (245).

The flow stop step (210) is stopping the flow of column feed stream (320) into the distillation vessel (355) once the mass (or volume) of liquid waste to be recycled has flowed into the distillation vessel (355). A volume determination is considered the equivalent to a mass determination since these are easily substituted physical measurements. Thus, a flow meter may be used to determine when the flow of the column feed stream (320) should be stopped.

The pressure reducing step (215) is performed after stopping the flow of column feed stream (320) into the distillation vessel (355) and the step requires reducing the pressure in the distillation vessel (355). While evaporation takes place during pump-in, the pressure is preferably maintained at about 100-1000 mm Hg (abs). From this level, during the batch steps, the pressure is preferably gradually or in steps reduced to 0.5-3.0 mm Hg (abs) for waste lubricants and waste fuels or to 30-100 mm Hg (abs) for waste coolants.

The $2^{nd}$ heating step (220) is performed after stopping the flow of column feed stream into the distillation vessel. The $2^{nd}$ heating step (220) is preferably carried out while performing the pressure reducing step (215), the $2^{nd}$ heating step (220), and the sending vapors step (230). The $2^{nd}$ heating step (220) requires, heating the column feed stream in a reboiler (335) to continue forming the heated bottoms stream (336). The reboiler (335) is the term for a heat exchanger or heater typically used to provide heat to the bottom of industrial distillation columns. The $2^{nd}$ heating step (220) is conducted either sequentially after or prior or concurrently to the pressure reducing step (215).

The returning bottoms-stream step (225) is performed after stopping the flow of column feed stream (320) into the distillation vessel (355) and the step requires returning the heated bottoms stream (336) to the distillation vessel (355) until the heated bottoms stream (336) within the distillation vessel (355) reaches a target temperature in a range of 120 degrees Centigrade to 310 degrees Centigrade.

Temperature of residual feedstock in the column in the distillation vessel (355) is increased and at the same time the pressure in the column is dropped (that is, the vacuum is increased). The temperature increase generally depends upon the type of waste. For waste coolants, for example, the temperature is increased to about 250-450° F. (120-232° C.). In one preferred embodiment, the temperature is increased to about 300-350° F. (150-175° C.). For waste lubricants, for example, the temperature is increased to about 500-600° F. (260-310° C.). For waste fuels, for example, the temperature is increased to about 430-600° F. (230-310° C.). The continuous evaporation step during pump-in is typically carried out at 100-1000 mm Hg (abs). From this level, during the batch processing, the pressure may be gradually or in steps reduced to 0.5-3.0 mm Hg (abs) for waste lubricants and waste fuels or to 30-100 mm Hg (abs) for waste coolants.

A mechanical-type or steam-ejector-type or a combined vacuum system is connected to the condenser and produces desired level of vacuum by either control of a restriction valve, variable-frequency drive on the mechanical-type vacuum compressor or flow of steam to one or more ejectors.

The sending vapors step (230) is performed after stopping the flow of column feed stream (320) into the distillation vessel (355) and the step requires sending gaseous vapors (356) formed in the distillation vessel (355) out of the distillation vessel (355) to a heat exchanger, also called a condenser (360), to remove heat from gaseous vapors (356) and continue to create the liquid effluent (366) and the gaseous effluent (367).

The returning first-volume step (235) is performed after stopping the flow of column feed stream (320) into the distillation vessel (355) and the step requires continuing to return the first volume of the liquid effluent (380) to the distillation vessel (355). The returning first-volume step (235) is preferably carried out while performing the pressure reducing step (215), the $2^{nd}$ heating step (220), and the sending vapors step (230).

The delivering first-product step (240) is performed after stopping the flow of column feed stream (320) into the distillation vessel (355). The delivering first-product step (240) is preferably carried out while performing the pressure reducing step (215), the $2^{nd}$ heating step (220), the returning bottoms-stream step (225) and the sending vapors step (230). The delivering first-product step (240) requires delivering the second volume of liquid effluent (381) as the first product. The first product is the condensate sent via the condensate pump (375) to the condensate tank (390).

For a multi-component liquid waste, the ability to produce different condensate products is a considerable advantage of the present invention. It should be noted that the batch steps (205) of the process can easily produce different condensate products depending on the temperatures and pressures used during the batch steps (205) of the process. For example, evaporated water and light hydrocarbons can be split further through an oil-water separator to separate aqueous and hydrocarbon phases or by "partial condensation." To aid in producing different condensate products, one can reroute the condensate to different tanks at different times during the batch steps (205) when the temperatures and pressures are amenable to such production.

The delivering first-product step (240) is most effectively performed when relatively pure mixtures of light components or a narrow cut of hydrocarbon fractions is desired, e.g., ethyl and propyl glycols with a combined purity of 95% or more. When so re-introduced, the flash zone vapors are "rectified," i.e., high-boiling components are condensed even as low-boiling components of the reflux liquid evaporate, thus allowing a more narrow mix of compounds in the vapor—typically water, and if applicable, the glycols, solvents and light hydrocarbon vapors—exit the column in the distillation vessel (355).

The delivering second-product step (245) is performed after the target temperature within the distillation vessel (355) is achieved. The delivering second-product step (245) is preferably performed at the end of the batch steps (205). The delivering second-product step (245) requires delivering the heated bottoms stream (336) as a second product. This is achieved by opening the residue on/off valve (345) so that the heated bottoms stream (336) flows into the residue tank (385).

In general, the process ends after the preset temperature and pressure conditions (described above) are reached within the distillation vessel (355) for a set amount of time (typically a few minutes to few hours) or after a present mass (which depends on the yield of combined distillate fractions or preferably the yield of residue (bottoms) desired/aimed (e.g., 10-15% of the waste lubricant volume pumped-in or 5% of the waste coolant/antifreeze volume pumped-in) is produced by distillation.

Additionally, some residual of the column feed stream (320) may be kept circulating through the reboiler (335), so when the next pump-in begins, this residue can be used to provide initial heat to the cold feedstock being pumped in.

The residue tank (385) may be cooled by circulating cold wet waste feedstock through a coil installed in the tank or with a heat exchanger installed outside the residue tank and the residue circulating through one side of the heat recuperating exchanger and the other side flowing the cold waste feedstock from the storage tank (305). In this manner, heat present in the residue is recovered and the feedstock for subsequent batches is warmed. Similarly, the distillate fractions discharged from the condenser (namely the liquid effluent (366) and the gaseous effluent (367)) may be at elevated temperatures (e.g., 50-150° C.) and cooled by exchanging heat with cold wet feedstock (namely the first flow stream (306)). If this is done, then the two heat recuperating heat exchangers may be installed in series so as to recover maximum heat from the product streams (namely, the second volume of liquid effluent (381) and the heated bottoms stream (336) flowing into the residue tank (385)).

Having described the invention in detail, it will be apparent that modifications and variations are possible without departing the scope of the invention defined in the appended claims. Furthermore, it should be appreciated that all examples in the present disclosure are provided as non-limiting examples. The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the chemical recycling industry.

What is claimed is:

1. A process comprising continuous steps and batch steps for recycling liquid waste, said liquid waste including at least one of oil, fuel and antifreeze, the continuous steps comprising the steps of:
  determining a fixed volume of liquid waste to be recycled, said determination based on not exceeding a volumetric capacity of a distillation vessel used in the process;
  pumping a first flow stream of the fixed volume of liquid waste toward the distillation vessel in a continuous manner;
  mixing into the first flow stream a second-portion of a heated bottoms stream to form a column feed stream flowing into the distillation vessel;
  while flowing the column feed stream into the distillation vessel, maintaining a vacuum pressure in the distillation vessel in a range of 100 to 1000 millimeters of mercury absolute;
  while flowing the column feed stream into the distillation vessel, heating the column feed stream in a reboiler to form the heated bottoms stream;
  while flowing the column feed stream into the distillation vessel, returning a first portion of the heated bottoms stream to the distillation vessel and the second-portion of heated bottoms stream to mix with the first flow stream;
  while flowing the column feed stream into the distillation vessel, sending gaseous vapors formed in the distillation vessel out of the distillation vessel to a heat exchanger to remove heat from gaseous vapors and create a liquid effluent and a gaseous effluent;
  returning a first volume of the liquid effluent to the distillation vessel; and
  delivering a second volume of liquid effluent as a condensate product; and the batch steps comprising the steps of:
  stopping the flow of column feed stream into the distillation vessel once a mass of liquid waste to be recycled has flowed into the distillation vessel;
  after stopping the flow of column feed stream into the distillation vessel, reducing pressure in the distillation vessel;
  after stopping the flow of column feed stream into the distillation vessel, heating the column feed stream in a reboiler to continue forming the heated bottoms stream;
  after stopping the flow of column feed stream into the distillation vessel, returning the heated bottoms stream to the distillation vessel until the heated bottoms stream within the distillation vessel reaches a target temperature in a range of 120 degrees Centigrade to 310 degrees Centigrade;
  after stopping the flow of column feed stream into the distillation vessel, sending gaseous vapors formed in the distillation vessel out of the distillation vessel to a heat exchanger to remove heat from gaseous vapors and continue to create the liquid effluent and the gaseous effluent;

after stopping the flow of column feed stream into the distillation vessel, continuing to return the first volume of the liquid effluent to the distillation vessel;

after stopping the flow of column feed stream into the distillation vessel, delivering a second volume of liquid effluent as a first product; and after the target temperature within the distillation vessel is achieved, delivering the heated bottoms stream as a second product.

\* \* \* \* \*